M. HURLBUT.
COMBINED PLOW AND FERTILIZER DISTRIBUTER.
APPLICATION FILED AUG. 28, 1912.
1,109,756.
Patented Sept. 8, 1914.
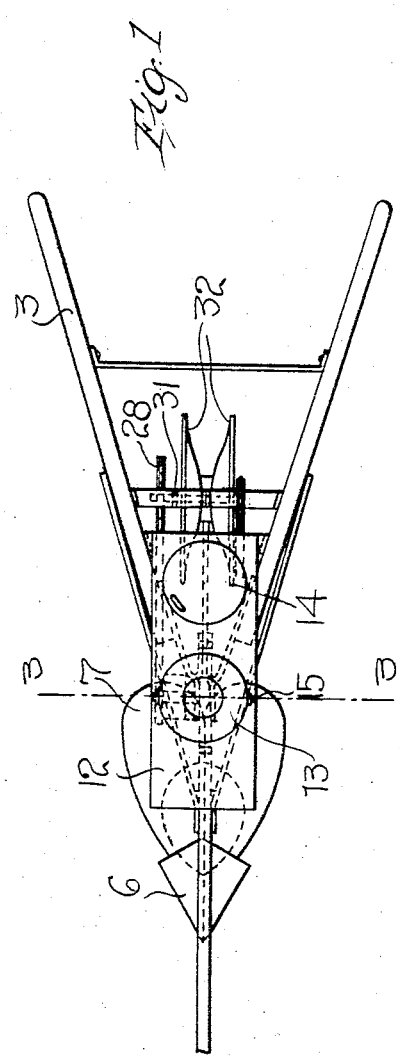
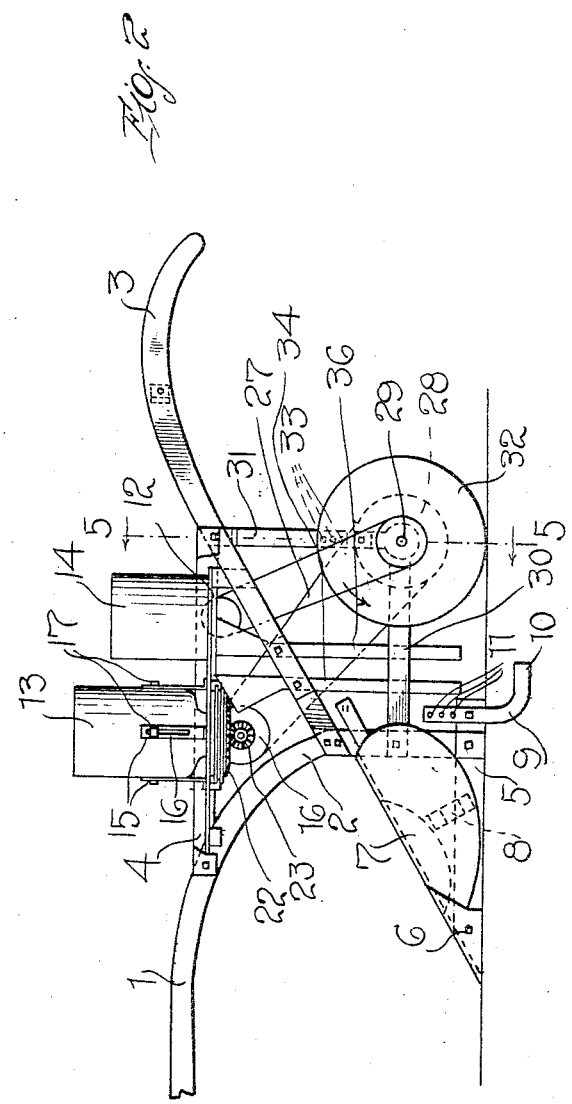
Inventor
M. Hurlbut,
By Watson E. Coleman
Attorney M. HURLBUT.
COMBINED PLOW AND FERTILIZER DISTRIBUTER.
APPLICATION FILED AUG. 28, 1912.

1,109,756.

Patented Sept. 8, 1914.

2 SHEETS—SHEET 2.

Inventor
M. Hurlbut,

Witnesses
Robert M. Sutphen.
A. I. Hind.

By Watson E. Coleman
Attorney

UNITED STATES PATENT OFFICE.

MILAN HURLBUT, OF WALLER, TEXAS.

COMBINED PLOW AND FERTILIZER-DISTRIBUTER.

1,109,756.

Specification of Letters Patent.

Patented Sept. 8, 1914.

Application filed August 28, 1912. Serial No. 717,621.

*To all whom it may concern:*

Be it known that I, MILAN HURLBUT, a citizen of the United States, residing at Waller, in the county of Waller and State of Texas, have invented certain new and useful Improvements in Combined Plows and Fertilizer-Distributers, of which the following is a specification, reference being had to the accompanying drawings.

This invention relates to certain improvements in combined plows and fertilizer distributers and in its broad aspect has for its primary object to provide improved means for feeding the fertilizer from the hopper or container to a depositing boot, from which the material is discharged into the furrow formed by the plow.

Another and more specific object of the invention resides in the provision of a rotatable cupped disk, means for mounting the disk in the frame of the machine beneath the fertilizer hopper, ground engaging disks to travel upon opposite sides of the furrow and direct the soil into the same over the fertilizer, and means driven from the disk axle for rotating said cup.

A still further object of my invention is to produce a machine of the above character which is comparatively simple in its construction, highly efficient and reliable in operation and may be manufactured at very small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 3:
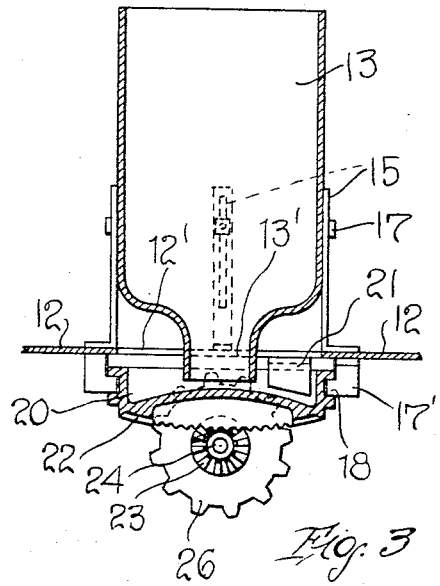
Figure 4:
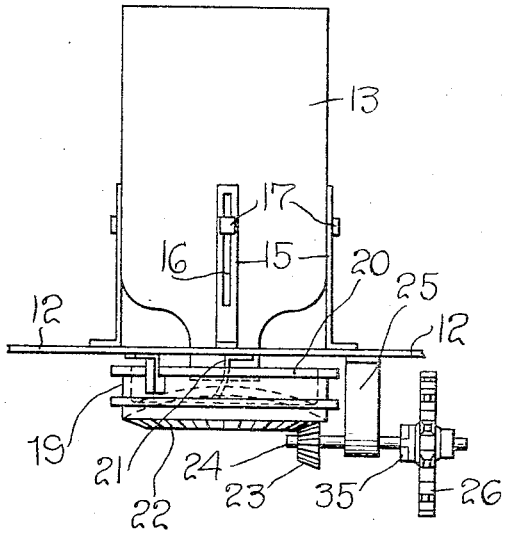
Figure 5:
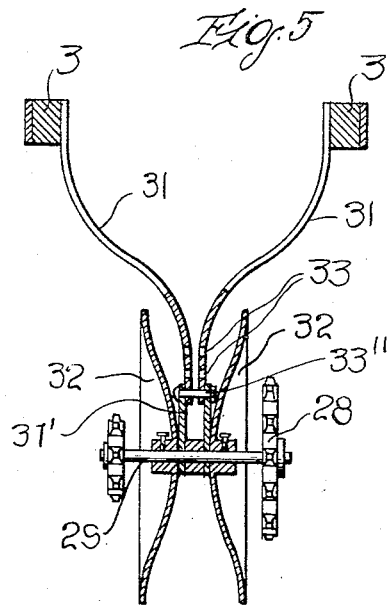

Figure 1 is a top plan view of a combination plow and fertilizer distributer embodying my invention in its preferred form; Fig. 2 is a side elevation thereof; Fig. 3 is a vertical section through the fertilizer box or hopper and the distributing means, taken on the line 3—3 of Fig. 1; Fig. 4 is a side elevation of the fertilizer hopper looking at right angles to Fig. 3; Fig. 5 is a vertical section taken on the line 5—5 of Fig. 2 illustrating the mounting of the covering disks.

Referring in detail to the drawings, 1 designates the beam, the rear end of which is curved downwardly to form the usual plow standard 2. Suitable handles 3 are secured at one of their ends to this standard and are connected to the beam 1 by means of the braces 4. A shoe or runner 5 is secured to the lower end of the standard 2 and extends forwardly therefrom, being suitably secured to the plow point 6.

7 indicates the mold boards which are braced as at 8 from the shoe or runner 5. A bar 9 is mounted upon the rear end of the land side and has its lower end angularly extended as at 10 to travel in the furrow formed by the plow point and guide the machine. The upper portion of the bar 9 is provided with a series of openings 11 whereby said bar may be adjusted upon the land side 5 in accordance with the depth of the furrow.

A horizontally disposed plate 12 is suitably mounted and supported upon the beam 1 and the handles 3. Upon this plate the fertilizer hopper 13 and the seed box 14 are arranged. The fertilizer hopper is vertically adjustable upon a plurality of upstanding bars 15 which are fixed at their lower ends upon the plate 12. Each of these bars is provided with a longitudinal slot 16 to receive a bolt 17 fixed to the hopper 13. The plate 12 is provided with an opening 12' through which the lower reduced end or neck 13' of the hopper is disposed. A plurality of hanger members 17' depend from the under side of the plate 12 and are provided with lugs 18 for engagement in an annular peripheral groove 19, formed upon the cup shaped disk 20 which receives the fertilizer. A baffle plate 21 is mounted upon the under side of the plate 12 adjacent the opening 12' thereof and extends into the cup 20. The base of this cup is preferably of convex form whereby the fertilizer centrally deposited upon the cup from the hopper 13 moves outwardly as the cup is rotated in the manner to be later described.

The cup 20 is provided with an annular beveled gear 22 for engagement by a pinion 23 fixed upon one end of a shaft 24 which is mounted in a suitable bearing 25 depending from the plate 12. A sprocket wheel 26 is fixed upon the other end of this shaft for engagement by the chain 27 whereby the shaft 24 is driven and the fertilizer distributing cup 20 rotated.

29 designates a short transversely disposed shaft which is mounted in the rear end of a bar 30, said bar at its other end being bolted to the standard 2. Upon one end of this shaft, a sprocket wheel 28 is fixed, and from said sprocket wheel the chain 27 is driven. The seed box 14 is provided with any approved form of feeding mechanism which is driven by a suitable chain connection from the other end of the shaft 29. 31 designates a pair of curved bars which are mounted at their upper ends upon the handles 3. Each of these bars is formed in two sections, the lower sections 31' being loosely engaged upon the shaft 29 on opposite sides of the bar 30. The other sections of the bars 31 are provided with a series of openings 33 to receive a connecting bolt 33'' whereby the bar sections 31' are adjustably connected to the main sections of said bars. Upon the shaft 29, spaced concavo-convex disks 32 are secured. It will be readily understood from this description, that by simply loosening the bolt which connects the bar 30 to the plow standard 2, the rear end of said bar may be elevated and the bolt 33'' inserted through the proper openings 33 to support the covering disks 32 at a desired height in accordance with the depth of the furrow.

From the foregoing description taken in connection with the accompanying drawings, it will be understood that in the movement of the machine over the ground, the disks 32 will be rotated, and rotation transmitted through the chain 27 and the gearing 22 and 23 to the fertilizer receiving cup 20, the fertilizer is continuously fed from the hopper 13 into said cup and as above stated, will work its way outwardly to the outer edge of the cup. As the cup is rotated, the fertilizing material banks up against the baffle plate 21 and is finally discharged over the upper edge of the cup and into the depositing boot 34, the lower end of which is disposed immediately above the furrow formed by the plow point 6. The quantity of fertilizer which is deposited in the furrow may be determined by the vertical adjustment of the hopper 13. In order to admit of the discontinuance of the discharge of fertilizer at the will of the operator, I provide a longitudinally movable clutch member 35 on the shaft 24 which is adapted to be shifted into or out of engagement with clutch teeth on one face of the sprocket 26, in any usual or well known manner. A depositing boot 36 is also mounted in the machine frame beneath the seed box 14 and receives the seed therefrom to deposit the same upon the fertilizer which has been previously distributed to the furrow.

In the operation of the machine, the furrow is formed by the plow point 6 as the machine moves over the ground, and as above stated, the fertilizer is continuously deposited in said furrow. The seeds are also deposited in a predetermined quantity upon the fertilizer and the concavo-convex disks 32 disposed upon opposite sides of the furrow direct a layer of earth inwardly over the fertilizer and the seed, thereby thoroughly covering the same. It will be appreciated that while my machine is comparatively simple in its construction, the mechanism provided is highly efficient and serviceable for the purposes in view. The several parts of the machine may be easily and quickly assembled or disassembled and replaced when necessary at a nominal cost.

While I have above described the preferred construction and arrangement of the several elements employed, it will be understood that the invention is susceptible of considerable modification therein and I therefore reserve the right to resort to all such legitimate changes as may be fairly embodied within the spirit and scope of the appended claims.

Having thus described the invention, what is claimed is:

1. In a machine of the character described, a frame, a plate secured in the frame, said plate being provided with an opening, a hopper mounted upon said plate and having an outlet neck extending through the opening therein, a fertilizer receiving cup rotatably mounted beneath the opening in said plate, a baffle plate secured to said first named plate adjacent the opening therein and extending into said cup, and means for rotating the cup.

2. In a machine of the character described, a frame, a plate secured in said frame and provided with an opening, a plurality of upstanding bars secured to the plate around the edge of said opening, a hopper vertically adjustable upon said bars, hangers depending from the under side of the plate, a rotatable fertilizer receiving cup supported by said hangers beneath the opening in the plate, a baffle plate extending into said cup, and means for rotating said cup.

3. In a machine of the character described, a frame, a plate secured in said frame and provided with an opening, a hopper supported upon said plate and having a reduced outlet neck extending through the opening therein, hangers depending from the under side of the plate at the edge of said opening, a fertilizer receiving cup provided with an annular groove in its periphery, each of said hangers having a lug extending into said groove, the base of the cup having a convex upper surface, a baffle plate secured to said first named plate and extending into said cup adjacent the outer edge thereof, means for vertically adjusting the hopper to position its outlet neck with respect to the convex surface of said cup, and means for rotating the cup.

In testimony whereof I hereunto affix my signature in the presence of two witnesses.

MILAN HURLBUT.

Witnesses:
J. C. RALSTON,
E. WILLIAMSON.

Copies of this patent may be obtained for five cents each, by addressing the "Commissioner of Patents, Washington, D. C."